Feb. 22, 1955   A. SMITH   2,702,689
VEHICLE DOLLY
Filed Oct. 3, 1952
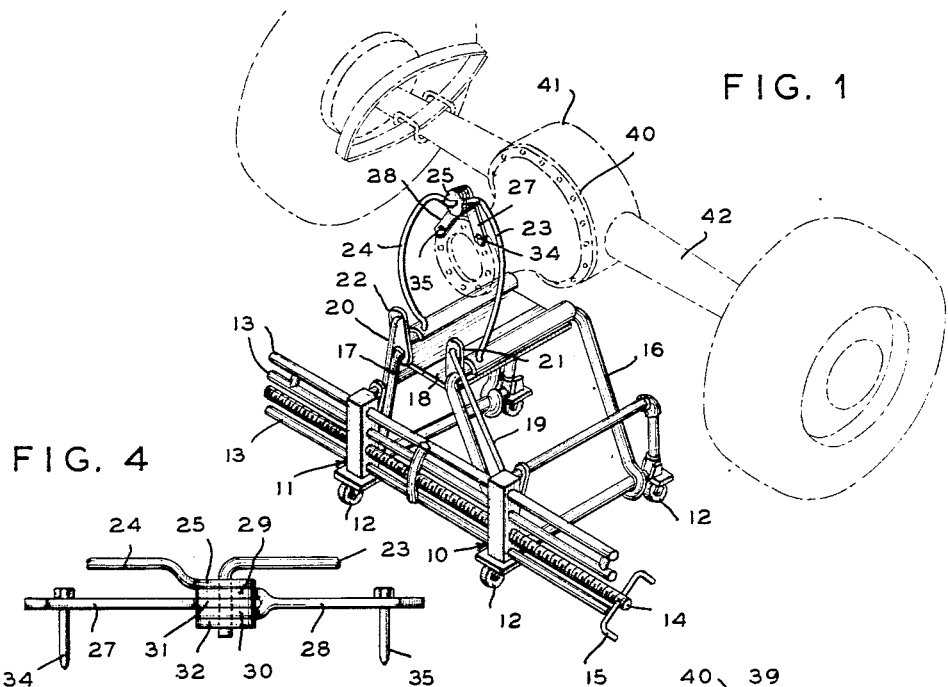
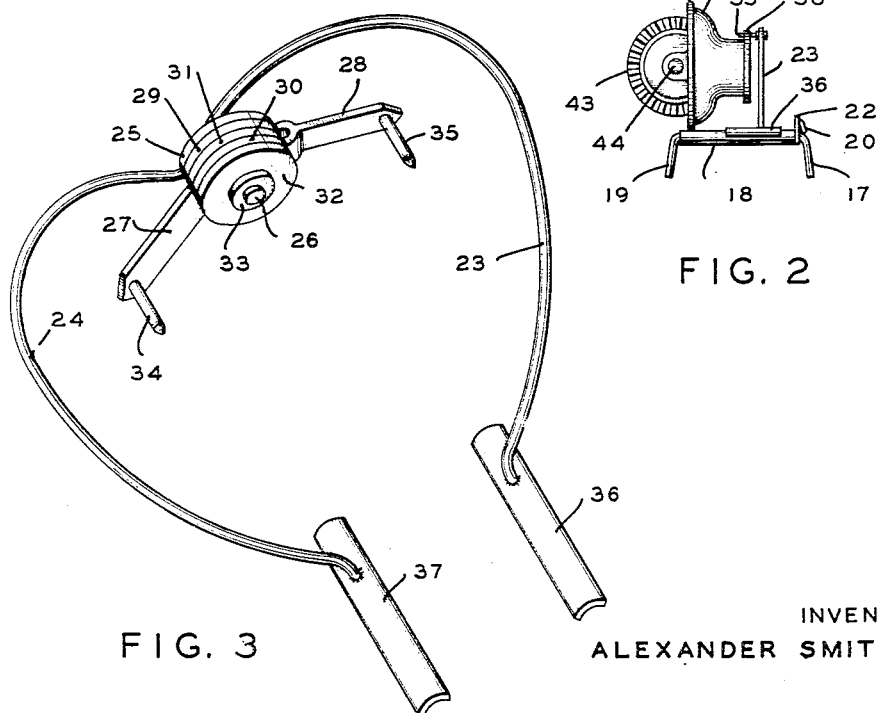
INVENTOR
ALEXANDER SMITH
BY A. Yates Dowell
ATTORNEY United States Patent Office 2,702,689
Patented Feb. 22, 1955

2,702,689

VEHICLE DOLLY

Alexander Smith, Sanford, Fla.

Application October 3, 1952, Serial No. 312,911

7 Claims. (Cl. 254—133)

This application relates to improvements in shop or garage equipment and particularly to improved means for supporting the differential units of vehicles to facilitate the installation and removal thereof and is an improvement over Patent 2,554,365.

While the dolly mechanism described in the prior application referred to above has been found to be highly effective in facilitating the handling of various parts such as transmission and differential units, it has been found that the handling of certain special types of vehicle parts can be further facilitated by providing attachments or accessories for the improved dolly and particularly that a heavy differential unit such as is ordinarily associated with continuous or "banjo" type heavy truck axles is greatly facilitated by the provision of an attachment arranged to firmly support such a unit on the supporting members of the dolly.

In using the improved dolly in the removal and installation of differential units such as are commonly used in heavy trucks considerable difficulty has been experienced in properly supporting the differential unit on the dolly in a manner such that the apertures in the flange of the differential carrier and the corresponding flange of the axle housing can be matched to permit the insertion of the bolts which secure the carrier to the axle. This difficulty is occasioned largely by the extremely irregular shape of the differential carrier which normally comprises a generally frusto-conical body having at each end thereof a flange at right angles to the longitudinal center line of the body. When an object of such shape is supported on the dolly described on the prior application referred to, the only portion resting on the dolly when the unit is ready for assembly is the bottom portion of the larger flange. The unit is thus not stable and may also be rotated to a position in which the flange holes in the carrier and the axle housing do not register and require a considerable amount of labor and considerable danger of injury to the workmen in holding the unit in proper position for assembly and matching the bolt holes.

It is among the objects of the present invention to provide a dolly attachment by means of which a vehicle part, such as the differential unit indicated above, may be firmly supported on the dolly so that the bolt receiving holes in the flanges of the differential carrier and the axle may be easily brought into registry by the adjustment of the dolly and one mechanic is enabled to assemble the differential unit with the axle without material difficulty and without danger of injury.

A further object resides in the provision of a dolly attachment by means of which vehicle parts of irregular shape may be firmly supported on the dolly in correct position for assembly or disassembly with other parts of the vehicle.

A still further object resides in the provision of an accessory for a dolly adapted to support vehicle parts for assembly and disassembly which accessory will enable a mechanic to assembly or disassemble the supported part with another vehicle part without requiring assistance and without danger of personal injury.

Other objects and advantages will become apparent from a consideration of the following description in conjunction with the accompanying drawing wherein:

Fig. 1 is an isometric view of a dolly in a position to support a vehicle part with a dolly accessory illustrative of the invention supported on the dolly and operatively engaged with the part to be removed or attached;

Fig. 2 is a side elevational view of the dolly and accessory and a vehicle unit supported on the dolly by the accessory;

Fig. 3 is an isometric view of the accessory; and,

Fig. 4 is a plane view of a portion of the accessory showing the manner in which the various parts thereof are pivotally connected.

With continued reference to the drawing and particularly to Fig. 1, the improved dolly comprises a pair of side frames 10 and 11, of rectangular shape each supported on suitable casters 12. The two frames are provided at corresponding ends with respective guide blocks through which extend guide rods 13 which maintain the frames parallel to each other. A screw shaft 14 also extends through the same guide blocks and is provided on its opposite end portions with oppositely directed screw threads and is effective on rotation thereof to move frames 10 and 11, toward and away from each other. This screw shaft may be rotated by a suitable crank 15. Respective link members 16 and 17 of rectangular form are pivotally connected to the lower bars of frames 10 and 11 and are connected at their free ends by a suitable flat link or a hinge plate 18 provided in two separate parts the abutting edges of which are maintained in abutting relationship by respective links 19 and 20 each fastened at one end to the respective side frame and connected at its opposite end to a respective arm, 21 and 22, secured to the corresponding part of the member 18.

This arrangement provides a pair of parallel generally cylindrical supporting surfaces which may be raised or lowered by the screw shaft 14 to raise and lower a vehicle part to and away from its position of assembly with another part of the vehicle. The dolly accessory, as is particularly illustrated in Figures 3 and 4, comprises a pair of curved leg members 23 and 24 pivotally secured together at adjacent ends. The pivotal connection between the leg members may conveniently comprise an apertured washer or lug 25 on one member and a bent over end portion on the other member constituting a hinge pin or axle for the pivotal connection.

A pair of arms 27 and 28 are pivotally mounted on the axle 26. One of these arms is preferably provided at its pivoted end with a pair of parallel apertured washers or lugs 29 and 30 and the other arm is provided with a single apertured washer or lug 31 which is received between washers or lugs 29 and 30. A free washer 32 is secured on the axle 26 against the outer side of the lug 30 and is held in place by a suitable retaining means 33.

The outer end portions of the arms 27 and 28 are apertured for and receive threaded pins or dowels 34 and 35 respectively. At the ends opposite the pivotally connected ends thereof the leg members are connected to respective supporting bases 36 and 37. Where the supporting surfaces of the dolly are parallel cylindrical bars, as illustrated in Fig. 1, these supporting bases may conveniently be provided as elongated cylindrical concave members. They may, however, have any other shape that will effectively support the accessory on the supporting members of the dolly.

In using the device the dolly is positioned under the differential of the vehicle and, the drive shaft and rear universal joint having been disconnected, the dolly with the accessory positioned thereon is moved to a position such that the pins 34 and 35 register with bolt holes in the forward flange 38 of the differential carrier 39 the pins are then threaded into these bolt holes until the arms 27 and 28 are firmly secured to the front flange of the carrier. The bolts are then removed from the rear flange 40 of the carrier and the dolly may then be moved to withdraw the differential unit from the rear axle housing 41. As is shown in Figures 1 and 2, the rear axle 42 is a continuous or banjo type rear axle and the differential mechanism is provided as a unitary mechanism connected to the axle housing by suitable bolts which secure the rear flange 40 of the differential carrier to an internal flange provided in the housing 41. The differential ring gear 43 and the various differential gears and other mechanisms associated therewith are supported on the carrier 39 by suitably spaced apertured lugs, as indicated at 44, which project rearwardly from the carrier 39 and are usually integral therewith.

In order to assemble a new or repaired differential with the axle the unit is secured to the accessory in the manner illustrated in Fig. 2, the accessory is mounted on the dolly and the dolly with the unit supported thereon is moved to a position relative to the vehicle axle such that the differential mechanism enters the housing 41. The dolly may then be raised or lowered by means of the screw shaft 14 to match the holes of the differential carrier flange with the holes in the corresponding housing flange. During the matching of the flange holes the differential unit will be held against rotation in the proper position so that the bolt holes will match as soon as the proper elevation of the unit is obtained.

When the holes are matched the bolts may be inserted by the mechanic and the differential unit will be held firmly in place until it is secured to the axle by the attaching bolts.

There is thus provided a dolly accessory by means of which a vehicle part of irregular shape, such as a unitary differential mechanism for a continuous axle housing, may be held in proper position during assembly or disassembly and the assembly or disassembly may be performed by a mechanic without assistance and without danger of injury.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A dolly attachment comprising a pair of curved leg members pivotally connected at corresponding ends to each other and to a pair of relatively movable arms shorter than said leg members; a pair of work engaging pins extending one through the apertured outer end portion of each arm; and a supporting base on the end of each arm opposite the pivotally connected end thereof, each base comprising an elongated cylindrically concave member adapted to rest on a cylindrical supporting surface.

2. A device for supporting a machine assembly comprising a pair of pivotally connected leg members, arms pivotally supported from the pivoted connection of said leg members, work engaging means carried by said arms, and means attached to said leg members for supporting said device on a dolly.

3. A dolly accessory for supporting a vehicle part of irregular shape on a dolly having vertically adjustable supporting surfaces comprising a pair of leg members pivotally secured together; a pair of arms pivotally secured on the pivot of said leg members; work engaging means carried by said arms; and leg attached means for detachably seating said accessory on a dolly.

4. An attachment for use in supporting work on an elevating device comprising a pair of spaced, curved, leg members, one of said leg members having a portion bent substantially at right angles at its body to provide a hinge pin, and the other of said arms having an apertured portion for receiving said hinge pin, a pair of shorter arms pivotally mounted on the portion of the first arm which forms the hinge pin, and having locating pins one on each of said arms in spaced relation from its pivoted end for contact with the work, and a supporting base on the end of each arm opposite the pivotally connected end thereof.

5. An attachment for use in supporting work on an elevating device comprising a pair of spaced leg members constructed to rest on laterally movable portions of an elevating device, said leg members being pivotally connected, and a pair of pivotally mounted arms carried by said leg members on the pivotal connection of said leg members and provided with guiding lugs for engagement with work.

6. A combination dolly and work engaging attachment for supporting the differential unit of a vehicle comprising a pair of relatively movable supporting members, means for raising and lowering said members, a work engaging attachment having a pair of base members for engaging said supporting members, said base members being formed for complementary engagement with said supporting members, a pair of leg members carried by said base members and having their opposite ends joined by a connecting pivot, a pair of relatively movable work supporting arms mounted on the connecting pivot of said leg members and having portions for engagement with the work.

7. A combination dolly and work engaging attachment for supporting the differential unit of a vehicle comprising a pair of relatively movable supporting members having curved upper surfaces, means for raising and lowering said members, a work engaging attachment having a pair of base members with curved lower surfaces for engaging the curved upper surfaces of said supporting members, a pair of leg members carried by said base members and having their opposite ends joined by a connecting pivot, a pair of relatively movable work supporting arms mounted on the connecting pivot of said leg members and having portions for engagement with the work.

References Cited in the file of this patent

UNITED STATES PATENTS

| 695,625 | Roach | Mar. 18, 1902 |
| 1,016,914 | Christiana | Feb. 6, 1912 |
| 1,323,127 | Treuthardt | Nov. 25, 1919 |
| 2,329,613 | Hohanson et al. | Sept. 14, 1943 |
| 2,523,734 | Stephensen et al. | Sept. 26, 1950 |
| 2,554,365 | Johnston, Jr. et al | May 21, 1951 |
| 2,568,508 | Montague | Sept. 18, 1951 |
| 2,583,114 | Monteith | Jan. 22, 1952 |
| 2,672,243 | Marsh | Mar. 16, 1954 |

FOREIGN PATENTS

| 881,968 | France | May 13, 1943 |